United States Patent
Zitting

(10) Patent No.: US 7,319,717 B2
(45) Date of Patent: Jan. 15, 2008

(54) DEVICE AND METHOD FOR ENABLING COMMUNICATIONS SIGNALS USING A MEDIUM VOLTAGE POWER LINE

(75) Inventor: Brent R. Zitting, Huntsville, AL (US)

(73) Assignee: International Broadband Electric Communications, Inc., Huntsville, AL (US)

( * ) Notice: Subject to any disclaimer, the term of this patent is extended or adjusted under 35 U.S.C. 154(b) by 123 days.

(21) Appl. No.: 11/170,413

(22) Filed: Jun. 28, 2005

(65) Prior Publication Data
US 2006/0291546 A1 Dec. 28, 2006

(51) Int. Cl.
*H04L 5/16* (2006.01)
*H05B 11/01* (2006.01)

(52) U.S. Cl. .................. 375/222; 340/310.11
(58) Field of Classification Search ........... 375/222, 375/219, 257, 316, 295; 340/310.11
See application file for complete search history.

(56) References Cited

U.S. PATENT DOCUMENTS

| | | | | |
|---|---|---|---|---|
| 1,730,412 A | 10/1929 | Duncan, Jr. | ............ | 340/310.01 |
| 4,142,178 A | 2/1979 | Whyte et al. | ........... | 340/310 R |
| 4,438,519 A | 3/1984 | Bose | ............................. | 375/1 |
| 4,471,399 A | 9/1984 | Udren | ......................... | 361/64 |
| 4,845,466 A | 7/1989 | Hariton et al. | .......... | 340/310 R |
| 5,351,272 A | 9/1994 | Abraham | ..................... | 375/38 |
| 5,684,826 A | 11/1997 | Ratner | ........................ | 375/222 |
| 5,777,769 A | 7/1998 | Coutinho | .................... | 359/173 |
| 5,856,776 A | 1/1999 | Armstrong et al. | .... | 340/310.01 |
| 5,864,284 A | 1/1999 | Sanderson | ............. | 340/310.01 |
| 5,892,430 A | 4/1999 | Wiesman et al. | ...... | 340/310.01 |
| 5,892,431 A | 4/1999 | Osterman | ............... | 340/310.01 |
| 5,929,750 A | 7/1999 | Brown | ................... | 340/310.02 |

(Continued)

FOREIGN PATENT DOCUMENTS

WO WO 01/82497 A1 11/2001

(Continued)

OTHER PUBLICATIONS

PCT, Notification of Transmittal of the International Search Report and the Written Opinion of the International Searching Authority, or the Declaration, PCT/US06/25642, 10 pages, date mailed Dec. 18, 2006.

(Continued)

*Primary Examiner*—Tesfaldet Bocure
(74) *Attorney, Agent, or Firm*—Baker Botts L.L.P.

(57) ABSTRACT

In one embodiment, a device for enabling communications signals over a medium voltage power line includes a first modem, a second modem, a third modem, and one or more switches. The first modem is electrically coupled to a medium voltage power line and is adapted to receive communications signals from the medium voltage power line. The second modem is electrically coupled to the medium voltage power line and is adapted to transmit communications signals to the medium voltage power line. The third modem is electrically coupled to a low voltage power line and is adapted to transmit communications signals to the low voltage power line. The one or more switches are coupled to the first modem, the second modem, and the third modem, and they are operable to transfer communications signals between two or more of the first modem, the second modem, and the third modem.

22 Claims, 3 Drawing Sheets

U.S. PATENT DOCUMENTS

| | | | | |
|---|---|---|---|---|
| 5,933,071 | A | 8/1999 | Brown | 340/310.01 |
| 5,937,342 | A | 8/1999 | Kline | 455/402 |
| 5,949,327 | A | 9/1999 | Brown | 340/310.01 |
| 6,037,678 | A | 3/2000 | Rickard | 307/89 |
| 6,040,759 | A | 3/2000 | Sanderson | 340/310.01 |
| 6,144,292 | A | 11/2000 | Brown | 340/310.02 |
| 6,243,571 | B1 | 6/2001 | Bullock et al. | 455/402 |
| 6,278,357 | B1 | 8/2001 | Croushore et al. | 340/310.01 |
| 6,282,405 | B1 | 8/2001 | Brown | 455/6.1 |
| 6,396,392 | B1 | 5/2002 | Abraham | 340/310.01 |
| 6,396,393 | B2 | 5/2002 | Yuasa | 340/310.01 |
| 6,452,482 | B1 | 9/2002 | Cern | 340/310.01 |
| 6,492,897 | B1 | 12/2002 | Mowery, Jr. | 340/310.01 |
| 6,493,201 | B1 | 12/2002 | Kulkarni et al. | 361/119 |
| 6,496,104 | B2 | 12/2002 | Kline | 340/310.01 |
| 6,646,447 | B2 | 11/2003 | Cern et al. | 324/539 |
| 6,683,531 | B2 | 1/2004 | Diamanti et al. | 340/310.03 |
| 6,785,532 | B1 | 8/2004 | Rickard | 455/402 |
| 6,809,633 | B2 | 10/2004 | Cern | 340/310.07 |
| 6,844,810 | B2 | 1/2005 | Cern | 340/310.07 |
| 6,854,059 | B2 | 2/2005 | Gardner | 713/171 |
| 6,876,289 | B2 | 4/2005 | Lenk et al. | 337/30 |
| 6,885,674 | B2 * | 4/2005 | Hunt et al. | 370/420 |
| 6,897,764 | B2 | 5/2005 | Cern | 340/310.01 |
| 6,965,302 | B2 * | 11/2005 | Mollenkopf et al. | 370/475 |
| 6,980,089 | B1 | 12/2005 | Kline | 340/310.01 |
| 2001/0038329 | A1 | 11/2001 | Diamanti et al. | 340/310.01 |
| 2001/0045888 | A1 | 11/2001 | Kline | 340/310.01 |
| 2001/0053207 | A1 * | 12/2001 | Jeon et al. | 379/90.01 |
| 2002/0002040 | A1 | 1/2002 | Kline et al. | 455/402 |
| 2002/0097953 | A1 | 7/2002 | Kline | 385/24 |
| 2002/0105413 | A1 | 8/2002 | Cern et al. | 340/310.01 |
| 2002/0109585 | A1 | 8/2002 | Sanderson | 340/310.01 |
| 2002/0171535 | A1 | 11/2002 | Cern | 340/310.07 |
| 2003/0039257 | A1 | 2/2003 | Manis et al. | 370/400 |
| 2003/0054793 | A1 | 3/2003 | Manis et al. | 455/402 |
| 2003/0160684 | A1 | 8/2003 | Cern | 340/310.01 |
| 2003/0190110 | A1 * | 10/2003 | Kline | 385/15 |
| 2003/0210135 | A1 | 11/2003 | Cern | 340/310.07 |
| 2003/0224784 | A1 | 12/2003 | Hunt et al. | 455/426.2 |
| 2003/0228005 | A1 | 12/2003 | Melick et al. | 379/93.01 |
| 2003/0234713 | A1 | 12/2003 | Pridmore, Jr. et al. | 336/82 |
| 2004/0003934 | A1 | 1/2004 | Cope | 174/36 |
| 2004/0056734 | A1 | 3/2004 | Davidow | 333/100 |
| 2004/0135676 | A1 | 7/2004 | Berkman et al. | 340/310.01 |
| 2004/0142599 | A1 | 7/2004 | Cope et al. | 439/620 |
| 2004/0223617 | A1 | 11/2004 | Corcoran et al. | 380/266 |
| 2004/0227621 | A1 | 11/2004 | Cope et al. | 340/310.01 |
| 2004/0227622 | A1 | 11/2004 | Giannini et al. | 340/310.01 |
| 2004/0246107 | A1 | 12/2004 | Kline | 340/310.01 |
| 2005/0001693 | A1 | 1/2005 | Berkman | 333/24 R |
| 2005/0007241 | A1 | 1/2005 | Kline et al. | 340/310.01 |
| 2005/0017825 | A1 | 1/2005 | Hansen | 333/242 |
| 2005/0030118 | A1 | 2/2005 | Wang | 333/24 R |
| 2005/0076149 | A1 | 4/2005 | McKown et al. | 709/249 |
| 2005/0111533 | A1 * | 5/2005 | Berkman et al. | 375/220 |
| 2005/0111553 | A1 | 5/2005 | Seok et al. | 375/240.17 |

FOREIGN PATENT DOCUMENTS

| | | |
|---|---|---|
| WO | 2004/068638 A2 | 8/2004 |

OTHER PUBLICATIONS

Mara, "Compatibility of Broadband Over Power Line Systems with Existing Electrical Distribution Infrastructure," HiLine Engineering LLC., white paper, 20 pages, Feb. 3, 2004.

Mitsubishi Electric, "Mitsubishi PLC/BPL System Overview," Mitsubishi Electric Corporation, slide handout sheets, 8 pages, Mar. 15, 2004.

Sumitomo Electric, "Development of PLC in Sumitomo Electric," Sumitomo Electric Industries, Ltd., slide handout sheets, 10 pages, Mar. 2004.

Arteche, "UNIC Interface Between PLC and Medium Voltage Power Lines," brochure, Arteche Group, ISO 9001:2000—ISO 14001, 2 pages, undated.

Arteche, "Soluciones de Acoplamientos PLC Coupling Solutions," brochure, Arteche Group, ISO 9001:2000—ISO 14001, 5 pages, undated.

Ilevo<>, "TPE LR 1000," brochure, Ilevo AB, 2 pages, Q1-03.

Ilevo<>, "Trial Kit," brochure, Ilevo AB, SP1001-MD-002, 2 pages, undated.

Ilevo<>, "CPE LR 100," brochure, Ilevo AB, PP1038-MD002, 2 pages, Q1-03.

Ilevo<>, "IR LR 1100," brochure, Ilevo AB, PP1009-MD002 LR 1100 IR Rev A, 2 pages, Q1-03.

Mitsubishi, "Specification" Products for low voltage / middle voltage, brochure, Mitsubishi Electric Corp., 1 page, prior to Apr. 14, 2004.

Ohio/Brass, "Quality Products for over 100 years," Supplemental Catalog Bulletin 31-16, Hubbell Power Systems, Inc., The Ohio/Brass Company, 3 pages, Oct. 1996.

Ohio/Brass, DynaVar® Distribution Class (PDV) and Riser Pole (PVR) Surge Arresters, brochure, Hubbell Power Systems, Inc., Ohio/Brass Company, ANSI/IEEE C62.11 Tested, IEC 99-4 Tested, Section 31, ISO 9001-94, Cert No. 002196, 15 pages, Oct. 1996.

Cooper, "Surge Arresters, UltraSIL™ Housed VariSTAR® Surge Arresters: Normal Duty (5 kA), Heavy Duty (10 kA), and Heavy Duty Riser Pole (10 kA)," Electrical Apparatus 235-35, brochure, Cooper Power Systems, 12 Pages, Jan. 2000 Supercedes Nov. 1996.

Hubbell, "PDE™ Distribution Class Elbow Arresters," brochure, Hubbell Power Systems, Inc., Ohio Brass Co., Section 69, ISO 9001-94, Cert. No. 002196, ANSI/IEEE C62.11 Tested, 8 pages, Nov. 2002.

Zitting, "Improved Coupling of Communications Signals to a Power Line," pending U.S. Appl. No. 11/425,271, 33 pages, filed Jun. 20, 2006.

Zitting, et al., "Improved Coupling of Communications Signals to a Power Line," pending U.S. Appl. No. 11/425,288, 30 pages, filed Jun. 20, 2006.

Zitting, et al., "Coupling Communications Signals to Underground Power Lines," pending U.S. Appl. No. 11/426,116, 30 pages, filed Jun. 23, 2006.

PCT, PCT/US06/21983, "Notification of Transmittal of the International Search Report and the Written Opinion of the International Searching Authority, or the Declaration," 10 pages, mailed Apr. 26, 2007.

PCT, Notification of Transmittal of the International Search Report and the Written Opinion of the International Searching Authority, or the Declaration, PCT/US06/26433, 10 Pages, date mailed Feb. 12, 2007.

* cited by examiner

DEVICE AND METHOD FOR ENABLING COMMUNICATIONS SIGNALS USING A MEDIUM VOLTAGE POWER LINE

TECHNICAL FIELD

This invention relates generally to communications networks and in particular to a system and method for enabling communications signals using a medium voltage power line.

BACKGROUND

Power systems utilize a variety of electrical devices and connectors to deliver electricity from a power station or generator to customers. Some power systems utilize a three-tiered approach that utilizes high voltage power lines with voltages in the range from approximately 60 kV to 100 kV, medium voltage power lines with voltages in the range from approximately 4 kV to 60 kV, and low voltage power lines with voltages in the range from approximately 90V to 600V.

In these three-tiered power systems, high voltage power lines typically connect a power station or generator to a substation. The substation serves a particular area such as a neighborhood or community and includes a transformer to step-down the voltage from high voltage to medium voltage. Typically, multiple sets of medium voltage power lines connect the substation to local distribution transformers. The distribution transformers typically serve the customers in close proximity to the distribution transformer and step-down the voltage from medium voltage to low voltage for use by the customers.

The power lines used to deliver electricity to customers have also been used to transmit and receive communications signals. For example, power lines have been used by utility companies to transmit and receive low bandwidth communications signals to monitor equipment and to read meters. Power lines have also been used to provide broadband communications for customers. For example, using existing technologies, low voltage power lines have been used to transmit communications signals to a wireless access point, which is further used to transmit the communications signals to a metropolitan area network (MAN). As another example, using existing technologies, low voltage power lines within a customer premises have been used to transmit communications signals for use by devices within the customer premises. As yet another example, using existing technologies, communications signals have been coupled to medium voltage power lines and delivered to a wireless access point, which then wirelessly transmits the communications signals to one or more customer devices having a wireless receiver.

SUMMARY OF THE INVENTION

In one embodiment, a device for enabling communications signals over a medium voltage power line includes a first modem, a second modem, a third modem, and one or more switches. The first modem is electrically coupled to a medium voltage power line and is adapted to receive communications signals from the medium voltage power line. The second modem is electrically coupled to the medium voltage power line and is adapted to transmit communications signals to the medium voltage power line. The third modem is electrically coupled to a low voltage power line and is adapted to transmit communications signals to the low voltage power line. The one or more switches are coupled to the first modem, the second modem, and the third modem, and they are operable to transfer communications signals between two or more of the first modem, the second modem, and the third modem.

Particular embodiments of the present invention may provide one or more technical advantages. For example, certain embodiments of the present invention may provide a device that is operable to regenerate at least a portion of a communications signal on a medium voltage power line and to communicate at least a portion of a communications signal to a low voltage power line. As another example, certain embodiments of the present invention may provide a device that can be used to support the transmission of communications signals over power lines at a reduced cost. As yet another example, certain embodiments of the present invention may provide for remote control over one or more devices used to support the transmission of communications signals over power lines. In addition, certain embodiments may provide one or more other technical advantages some, none, or all of which may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DESCRIPTION OF EXAMPLE EMBODIMENTS

Figure 1:
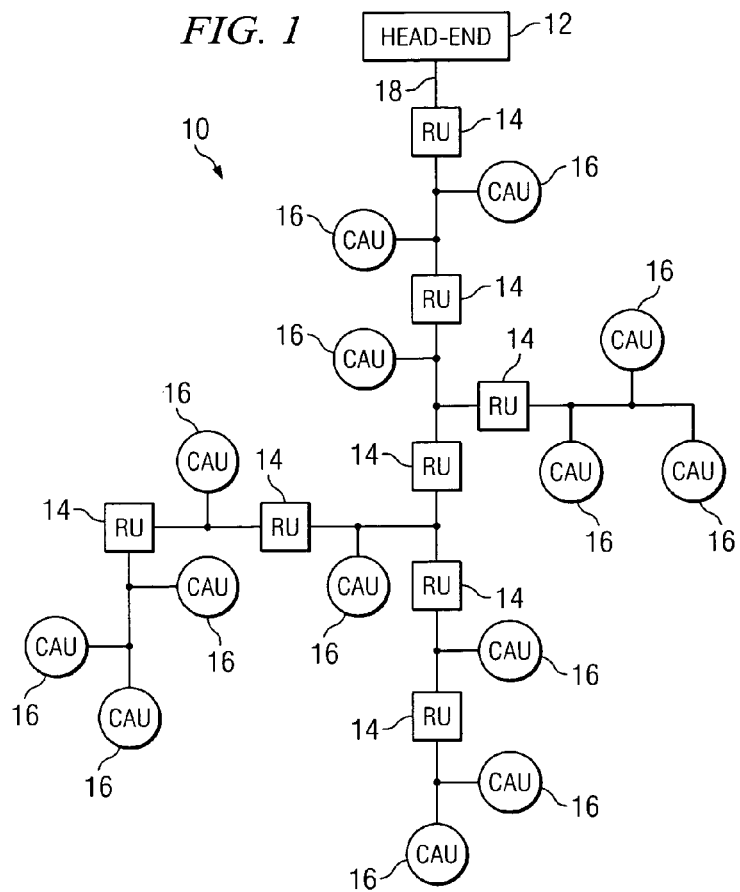
FIG. 1 illustrates a block diagram of an example power-line communications network utilizing medium voltage power lines to enable communications signals.

FIG. 1 illustrates a block diagram of an example power-line communications network, indicated generally at 10, utilizing medium voltage power lines to enable communications signals. In certain embodiments, power-line communications network 10 may function to provide one or more customers with access to a wide area network (WAN). For example, power-line communications network 10 may function to provide one or more customers with access to data services, video services, voice-over-Internet-Protocol (VoIP), or plain-old-telephone service (POTS). As another example, the broadband communications signals may represent upstream and/or downstream traffic at transmission rates of at least 1.5 Mbps. In a particular example, power-line communications network 10 may function to provide one or more customers with access to the Internet. In certain embodiments, power-line communications network 10 includes a head-end unit 12, regenerator units 14, customer access units 16, and medium voltage power lines 18.

Head-end unit 12 couples power-line communication network 10 to one or more external networks or content sources. In certain embodiments, head-end unit 12 includes hardware for coupling to one or more external networks and hardware for coupling to a medium voltage power line 18. In a particular embodiment, head-end unit includes hardware for transmitting and/or receiving communications signals, including a radio frequency (RF) carrier signal with digital information, on a medium voltage power line 18. Medium voltage power lines 18 represent transmission power lines operable to connect a substation to one or more distribution transformers. In certain embodiments, medium voltage power lines 18 may be overhead power transmission lines. In particular embodiments, medium voltage power lines 18 may deliver an alternating current (AC) of electricity between approximately 4 and 60 kilovolts. In certain embodiments, head-end unit 12 also includes hardware and/or software for transmitting and receiving communications signals to and from one or more external networks and communications network 10. For example, head-end unit 12 may couple communications network 10 to an Internet backbone through the use of a wireless and/or wireline connection, such as a fiber-optic connection. As another example, head-end unit 12 may couple power-line communications network 10 to a cable distribution network, to a voice-communications network, or to a wireless metropolitan area network (MAN). In certain embodiments, head-end unit may include a modem to interface with a medium voltage power line 18 and an optical transceiver to interface with a fiber-optic communication medium. Thus, head-end unit 12 represents any appropriate hardware and/or controlling logic for coupling communications network 10 to one or more external networks or content sources.

Regenerator units 14 may receive communications signals from medium voltage power line 18, regenerate the communications signals, and then transmit at least a portion of the communications signals back to medium voltage power line 18. Thus, a regenerator unit 14 represents any appropriate hardware and/or controlling logic for regenerating communications signals on medium voltage power line 18. In certain embodiments, regenerator unit 14 may include two or more modems and a switch. An example embodiment of regenerator unit 14 is discussed further in relation to FIG. 3.

Customer access units 16 operate to receive communications signals from medium voltage power line 18 and transmit at least a portion of the communications signals on a low voltage power line. Thus, a customer access unit 16 represents any appropriate hardware and/or controlling logic for receiving communications signals from medium voltage power line 18 and transmitting communications signals to low voltage power line 24. In certain embodiments, customer access unit 16 may include two or more modems and a switch. An example embodiment of customer access unit 16 is discussed further in relation to FIG. 4.

Medium voltage power line 18 represents a transmission power line operable to connect a substation to one or more distribution transformers. In certain embodiments, medium voltage power line 18 may be an overhead power transmission line. In particular embodiments, medium voltage power line 18 may deliver an alternating current (AC) of electricity between approximately 4 and 60 kilovolts.

In operation, communications signals are coupled to power-line communications network 10 through head-end unit 12. These communications signals are carried along medium voltage power lines 18 to one or more customer access units 16. As the communications signals travel along medium voltage power lines 18, the communications signals become attenuated. To minimize the effects of these attenuations, one or more regenerator units 14 may be utilized to regenerate the communications signals and, in certain embodiments, bypass any transformers that would degrade or destroy the communications signals. For example, in a particular embodiment, regenerator units 14 may be located approximately every half-mile along medium voltage line 18 to regenerate the communications signals. Once the communications signals reach customer access units 16, they are transmitted to low voltage distribution power lines for delivery to one or more customers (as well as being communicated past customer access units 16, as appropriate). In certain embodiments, communications signals transmitted over medium voltage power lines 18 may be bi-directional. For example, communications signals transmitted over medium voltage power lines 18 may generally travel from head-end unit 12 toward customer access units 16 and also from customer access units 16 toward head-end unit 12. In certain embodiments, the bi-directional functionality may be achieved through frequency domain multiplexing, through a half-duplex transmission protocol, or through other appropriate techniques. In certain embodiments, communications network 10 may operate to enable multiple end-users to transmit and/or receive broadband communications signals. For example, the broadband communications signals may represent upstream and/or downstream traffic at transmission rates of at least 200 Kbps.

Although, certain aspects and functions of the present invention are described in terms of receiving and/or transmitting communications signals, in certain embodiments, these functions may be reversed, as may be appropriate, without departing from the spirit and scope of the present invention.

Figure 2:
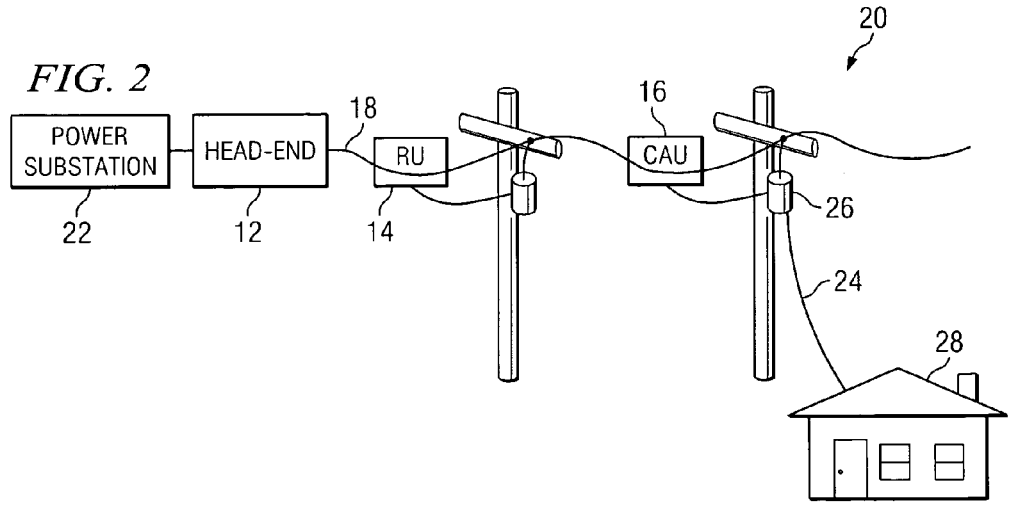
FIG. 2 illustrates an example power-line communications system including a regenerator unit and a customer access unit.

FIG. 2 illustrates an example power-line communication system, shown generally at 20, including a regenerator unit 14 and a customer access unit 16. In operation, regenerator unit 14 regenerates communications signals coupled to medium voltage power line 18 by head-end unit 12. Once these communications signals reach customer access unit 16, customer access unit 16 receives the communications signals, and transmits the signals to low voltage power line 24, for delivery to a customer 28.

In the embodiment shown, customer access unit 16 is located in close proximity to distribution transformer 26. Distribution transformer 26 generally operates to step-down the voltage from a medium voltage power line 18 to a low voltage power line 24. Low voltage power line 24 represents a distribution power line operable to connect distribution transformer 26 to one or more customers 28. In certain embodiments, low voltage power line 24 may deliver an alternating current (AC) of electricity between approximately 90 and 600 volts. Customer 28 may represent one or more residential or commercial customers of a power utility. Customer 28 may receive both power and communication signals though low voltage power line 24.

Figure 3:
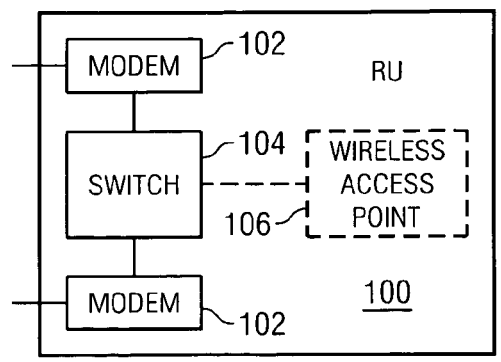
FIG. 3 illustrates an example regenerator unit included in a system for enabling communications signals using medium voltage power lines.

FIG. 3 illustrates an example regenerator unit, indicated generally at 14, included in communications network 10 and system 20. In the embodiment shown, regenerator unit 14 includes housing 100, two modems 102, switch 104, and wireless access point 106. In certain embodiments, regenerator unit 14 may be electrically coupled to medium voltage power line 18 and may be electrically coupled to an electrical power source to provide power for the elements of regenerator unit 14. In certain embodiments, the power source may be a low voltage power source. For example, in a particular embodiment, regenerator unit 14 is located in close proximity to a distribution transformer 26 and is electrically coupled to a low voltage distribution line connected to distribution transformer 26. In this embodiment, distribution transformer 26 steps down the electrical power carried by medium voltage power line 18 to a low voltage distribution line.

Housing 100 operates to create an enclosed area containing the elements of regenerator unit 14. In certain embodiments, housing 100 may operate to protect the elements of regenerator unit 14 and to simplify the installation of regenerator unit 14 by keeping the elements of regenerator unit 14 together with the appropriate internal connections. In certain embodiments, housing 100 may also provide structural support for the elements of regenerator unit 14 and may provide electrical insulation between certain elements of regenerator unit 14. In certain embodiments, housing may represent a weather proof, sealed container to enclose moisture sensitive elements of regenerator unit 14. For example, housing 100 may include a hinged aluminum case with one or more rubber seals and threaded closures. In a particular embodiment, housing 100 may have dimensions of less than 12 inches in height, width, and depth. For example, housing 100 may be a weatherproof Scientific-Atlanta CATV Line Extender Housing. However, any appropriate container may be used to contain the elements of regenerator 14 and/or the elements of regenerator unit 14 may be contained individually or in other combinations.

Modems 102 are electrically coupled to medium voltage power line 18. In certain embodiments, modems 102 are electrically coupled to a coupler which, in turn, is coupled to medium voltage power line 18. The coupler may couple to medium voltage power line 18 using inductive coupling, capacitive coupling, conductive coupling, a combination thereof, or any other appropriate technique. In a particular embodiment, each modem 102 is coupled to a coupler through the use of a coaxial cable and the coupler, in turn, is coupled to medium voltage power line 18 through the use of a metal oxide varistor (MOV) lighting arrester and its capacitive coupling properties. An MOV arrester serves as a high-pass filter that can withstand medium voltages. Thus, the high frequency communications signals pass through the MOV arrester, while the low frequency medium voltage current does not. The use of an MOV arrester to couple to a medium voltage power line 18 is cost effective and convenient because many existing power systems already contain MOV lightning arresters attached to medium voltage power lines 18.

In certain embodiments, each modem 102 included in regenerator unit 14 may be connected to a separate coupler. For example, regenerator unit 14 may couple to medium voltage power line 18 through the use of two MOV arresters separated by several feet with small ferrite donuts placed around the medium voltage power line 18 in between the two MOV arresters. In alternative embodiments, multiple modems 102 included in regenerator unit 14 may be connected to the same coupler. For example, two modems 102 included in a regenerator unit 14 may be connected to a single MOV arrester via a signal combiner.

In operation, modems 102 demodulate communications signals received from medium voltage power line 18 and/or modulate communications signals for transmission on medium voltage power line 18. Thus modems 102 represent any appropriate hardware and/or controlling logic for modulating and/or demodulating communications signals. In certain embodiments, modems 102 receive and transmit RF signals. For example, modems 102 may represent a Home-Plug Powerline Alliance (HPA) compliant modem or a Universal Powerline Association (UPA) compliant modem. In certain embodiments, modems 102 may transmit and receive communications signals through a coaxial connection using an F-connector. In a particular embodiment, modems 102 may represent a NetGear modems. Although, in certain embodiments, multiple modems 102 may be the same, this is not necessary.

Switch 104 may couple to modems 102 and wireless access point 106. In operation, switch 104 operates to receive and transmit digital communications signals among the elements of regenerator unit 14. Thus, switch 104 may represent any appropriate hardware and/or controlling logic for directing the flow of digital communications signals among multiple elements of regenerator unit 14. For example, in certain embodiments, switch 104 may be a router, a hub, or an Ethernet switch. In certain embodiments, switch 104 may have an IP address that is unique within power-line communications network 10.

In embodiments of regenerator unit 14 including wireless access point 106, wireless access point 106 operates to transmit and/or receive wireless communications signals. Thus wireless access point 106 represents any appropriate hardware and/or controlling logic for transmitting and/or receiving wireless communications signals. In certain embodiments, wireless access point 106 may transmit and/or receive wireless communications signals using an IEEE 802.11 standard protocol. In a particular embodiment, wireless access point may be a D-Link wireless access point coupled to switch 104 through the use of 10/100 base-T connectors.

In operation, regenerator unit 14 receives communications signals from medium voltage power line 18 via a coupler, demodulates the received communications signals, re-modulates at least a portion of the received communications signals, and transmits the re-modulated communications signals to medium voltage power line 18. Thus, in certain embodiments, regenerator unit 14 operates to allow communications signals to travel greater distances along medium voltage power line 18 without becoming attenuated. Accordingly, regenerator unit 14 may operate to receive communications signals from a medium voltage power line 18, amplify the communications signals and/or filter out certain types of signal noise, and then re-transmit the communications signals back on the medium voltage power line 18. In certain embodiments, wireless access point 106 may operate to provide wireless access to one or more wireless devices. For example, wireless access point 106 may operate to create a wireless "hot spot," by providing wireless Internet access to one or more wireless devices. In particular embodiments, wireless access point 106 may operate to allow for monitoring and/or modifying the operation of regenerator unit 14.

Figure 4:
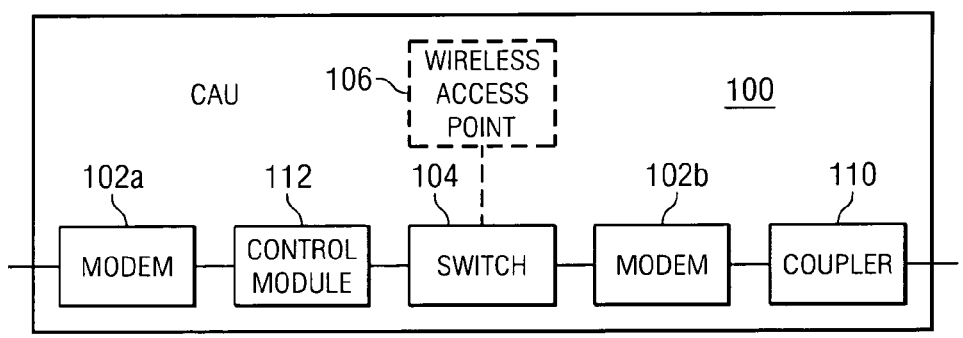
FIG. 4 illustrates an example customer access unit included in a system for enabling communications signals using medium voltage power lines.

FIG. 4 illustrates an example customer access unit, indicated generally at 16, included in communications network 10 and system 20. In the embodiment shown, customer access unit 16 includes housing 100, two modems 102, switch 104, wireless access point 106, coupler 110, and control module 112.

Housing 100, switch 104, and wireless access point 106 included in customer access unit 16 may be the same or substantially similar to housing 100, switch 104, and wireless access point 106 described above with regard to regenerator unit 14. For example, housing 100 may operate to protect the elements of customer access unit 16 and may operate to simplify the installation of customer access unit 16 by keeping the elements of customer access unit 16 together with the appropriate internal connections. In certain embodiments, housing 100 may also provide structural support for the elements of customer access unit 16 and may provide electrical insulation between certain elements of customer access unit 16. As another example, switch 104 may represent any appropriate hardware and/or controlling logic for directing the flow of digital communications signals among multiple elements of customer access unit 16. In certain embodiments, switch 104 may be a router, a hub, or an Ethernet switch.

Modems 102 included in customer access unit 116 may be the same or substantially similar to modems 102 described above with regard to regenerator unit 14, with the exception that modem 102b may electrically couple to low voltage power line 24. In operation, modem 102a demodulates signals received from medium voltage power line 18 and/or modulates communications signals for transmission on medium voltage power line 18; and modem 102b demodulates signals received from low voltage power line 24 and/or modulates communications signals for transmission on low voltage power line 24. Thus modems 102 represents any appropriate hardware and/or controlling logic for modulating and/or demodulating communications signals. In certain embodiments, modem 102a may be electrically coupled to a medium voltage power line 18 through a coupler using inductive coupling, capacitive coupling, conductive coupling, a combination thereof, or any other appropriate technique. In a particular embodiment, customer access unit 16 is coupled to a coupler through the use of a coaxial cable and the coupler, in turn, is coupled to medium voltage power line 18 through the use of a metal oxide varistor (MOV) lightning arrester.

Coupler 110 may electrically couple elements of customer access unit 16 to low voltage power line 24. Although, in certain embodiments, coupler 110 may be included within housing 100, in other embodiments, coupler 110 may be located outside of housing 100. Coupler 110 may couple modem 102b to low voltage power line 24 using inductive coupling, capacitive coupling, conductive coupling, a combination thereof, or any other appropriate technique. For example, coupler 110 may include multiple inductors and multiple capacitors. Coupler 110 operates to electrically transfer modulated communications signals transmitted by modem 102b to low voltage power line 24 for transmission to customer 28. Thus coupler 110 represents any appropriate hardware and/or controlling logic for electrically coupling modem 102b to low voltage power line 24 to transmit communications signals.

Control module 112 operates to control the operation of certain aspects of customer access unit 16. In certain embodiments, control module 112 may serve as a firewall, a router, and/or an agent. For example, control module 112 may collect and store information related to the quantity and type of communication signals received and transmitted by customer access unit 16. As another example, control module 112 may prevent particular portions of communications signals received by customer access unit 16 from being transmitted by customer access unit 16. In certain embodiments, control module 112 may operate to couple the elements of customer access unit 16 associated with portions of two logical networks. In certain embodiments, control module 112 may couple elements of customer access unit 16 associated with a wide area network (WAN) and with a local area network (LAN). For example, control module 112 may couple modem 102a associated with a WAN, such as a WAN formed at least in part by communications network 10, to modem 102b associated with a LAN, such as a LAN associated with customer 28. In certain embodiments, control module 112 may serve to control and/or limit the flow of communications signals between the WAN and the LAN. In certain embodiments, control unit 112 may operate to provide remote control and/or remote monitoring of certain aspects of customer access unit 16. For example, control module 112 may operate to provide remote control and/or remote monitoring through the use of simple network management protocol (SNMP) or through a terminal emulation program such as Telnet. In certain embodiments, control module 112 may operate as an SNMP agent to allow a remote administrator to monitor and/or control one or more parameters related to modems 102 and/or the communications signal traffic within customer access unit 16. In certain embodiments, control module 112 may include encryption algorithms to restrict access to the control features and or to restrict access from the WAN to the LAN.

In operation, customer access unit 16 may receive communications signals from a medium voltage power line 18 via the coupler, demodulate the received communications signals, re-modulate at least a portion of the received communications signals, and transmit the re-modulated communications signal to low voltage power line 24.

Although customer access unit 16 has been described as receiving communications signals from medium voltage power line 18 and transmitting communications signals to low voltage power line 24, customer access unit 16 may also receive communications signals from low voltage power line 24 and transmit communications signals to medium voltage power line 18. In certain embodiments, wireless access point 106 may operate to create a wireless "hot spot," by providing wireless Internet access to one or more wireless devices. In particular embodiments, wireless access point 106 may operate to allow for monitoring and/or modifying the operation of customer access unit 16.

Figure 5:
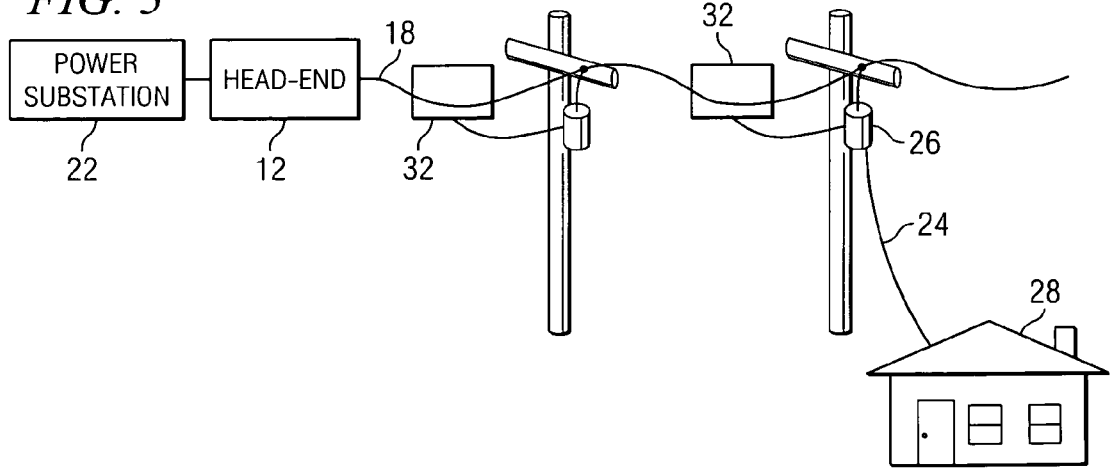
FIG. 5 illustrates an example power-line communications system including a regenerator/customer access unit.

FIG. 5 illustrates an example power-line communication system, shown generally at 30, for enabling communications signals using medium voltage power lines 18. In certain embodiments, the functions within system 20 served by regenerator unit 14 and customer access unit 16 are served within system 30 by regenerator/customer-access-unit 32. Regenerator/customer-access-unit 32 may operate to perform the functions of either regenerator unit 14 or customer access unit 16. In certain embodiments, regenerator/customer-access-unit 32 may operate to perform the functions of both regenerator unit 14 and customer access unit 16. For example, regenerator/customer-access-unit 32 may receive communications signals from medium voltage power line 18, transmit at least a portion of the communications signals to low voltage power line 24, regenerate at least a portion of the communications signals, and transmit the regenerated communications signals to medium voltage power line 18.

Figure 6:
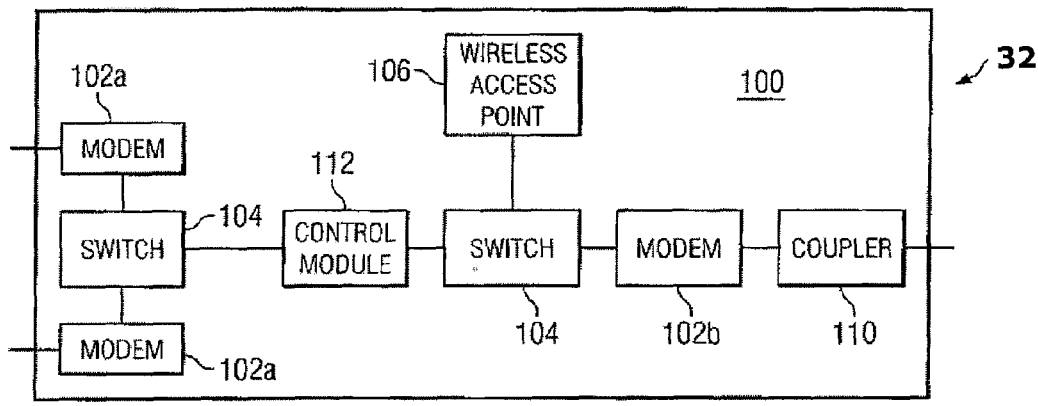
FIG. 6 illustrates an example regenerator/customer access unit included in a system for enabling communications signals using medium voltage power lines.

FIG. 6 illustrates an example regenerator/customer access unit, indicated generally at 32, included in system 30. In the embodiment shown, regenerator/customer access unit includes housing 100, two modems 102a, one modem 102b, two switches 104, one wireless access point 106, one coupler 110, and one control module 112.

Housing 100, switch 104, wireless access point 106, coupler 110, and control module 112 included in regenerator/customer-access-unit 32 may be the same or substantially similar to the same elements described above with regard to regenerator unit 14 and customer access unit 16. Modem 102a may operate to electrically couple to a medium voltage power line 18 and modem 102b may operate to electrically couple to a low voltage power line 24. In certain embodiments modem 102a may be the same or substantially similar to modem 102 described with respect to regenerator unit 14. Similarly, in certain embodiments, modem 102b may be the same or substantially similar to modem 102b described with respect to customer access unit 18. Thus modem 102, included in regenerator/customer-access-unit 32 represents any appropriate hardware and/or controlling logic for modulating and/or demodulating communications signals.

In certain embodiments, each modem 102a included in regenerator/customer-access-unit 32 may be connected to a separate coupler. For example, regenerator/customer-access-unit 32 may couple to medium voltage power line 18 through the use of two MOV arresters separated by several feet with small ferrite donuts placed around the medium voltage power line 18 in between the two MOV arresters. In alternative embodiments, multiple modems 102a included in regenerator/customer-access-unit 32 may be connected to the same coupler. For example, two modems 102a included in a regenerator/customer-access-unit 32 may be connected to a single MOV arrester via a signal combiner.

In operation, regenerator/customer-access-unit 32 may operate to regenerate communications signals on a medium voltage power line 18 and/or provide customer 28 with access to communications network 10. In certain embodiments, regenerator/customer-access-unit 32 may function as either a regenerator unit 14 or a customer access unit 16. In a particular embodiment, regenerator/customer access unit may function as both a regenerator unit 14 and a customer access unit 16. For example, regenerator/customer access unit 32 may receive communications signals from medium voltage power line 18, selectively communicate a portion of the received communications signals to low voltage power line 24, and selectively communicate a portion of the received communications signals to medium voltage power line 18. In certain embodiments, regenerator/customer-access-unit 32 may also receive wireless signals through the use of a wireless access point 106. For example, wireless signals received by a wireless access point 106 may include instructions for monitoring and/or modifying the operation of regenerator/customer-access-unit 32. As another example, wireless signals received by wireless access point 106 may be transmitted to a medium voltage power line 18 by a modem 102a or may be transmitted to a low voltage power line 24 by modem 102b. In certain embodiments, wireless access point 106 may operate to create a wireless "hot spot," by providing wireless Internet access to one or more wireless devices.

Figure 7:
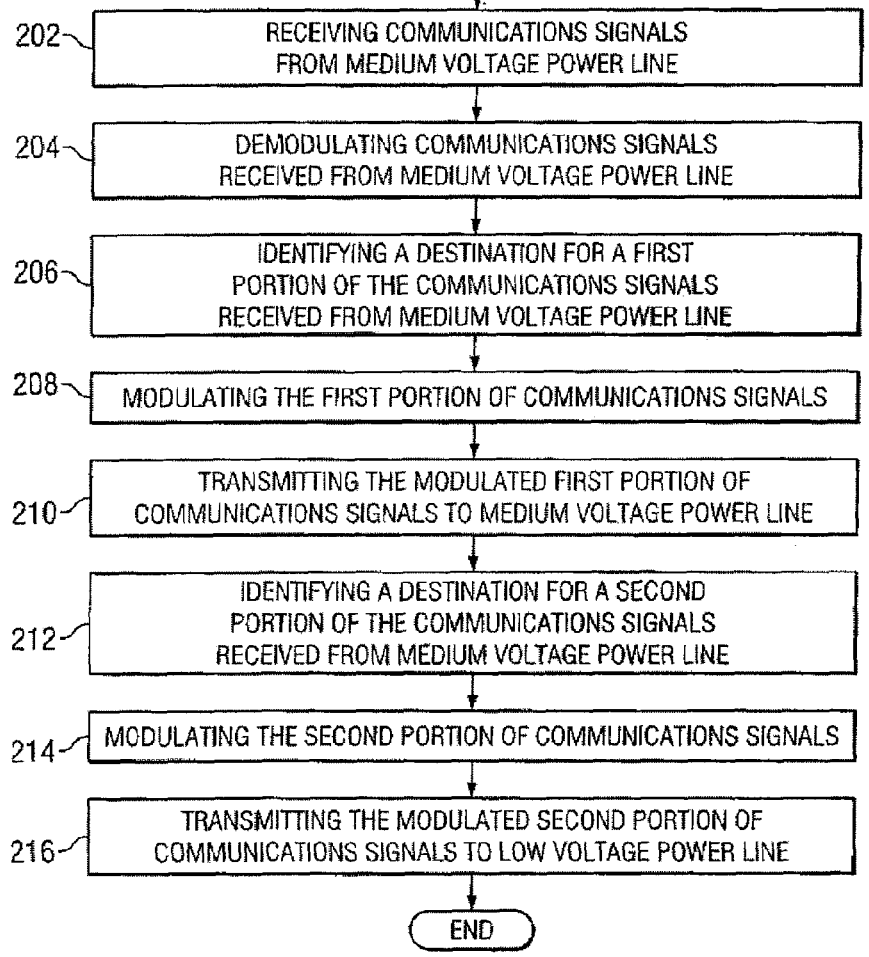
FIG. 7 illustrates an example method for enabling communications signals using medium voltage power lines.

FIG. 7 illustrates an example method, indicated generally at 200, for enabling communications signals using medium voltage power lines 18. At step 202, communications signals are received from medium voltage power line 18. In certain embodiments, communications signals may be received through a coupler coupled to medium voltage power line 18 using inductive coupling, capacitive coupling, conductive coupling, a combination thereof, or any other appropriate technique. For example, communications signals transmitted to medium voltage power line 18 by head-end unit 12 may be transmitted to regenerator/customer-access-unit 32 through the use of a metal oxide varistor (MOV) lightning arrester and its capacitive coupling properties. At step 204, the communications signals received from medium voltage power line are demodulated. In certain embodiments, the communications signals may be demodulated by modem 102a, included within regenerator/customer-access-unit 32. At step 206, a destination for a first portion of the communications signals received from medium voltage power line 18 is identified. In certain embodiments, the destination for the first portion may be identified by switch 104 and/or control module 112. For example, the destination for the first portion may be identified by a layer 2 or layer 3 TCP/IP address contained within the communications signals. At step 208, the first portion of communications signals are modulated. In certain embodiments, modem 102a may modulate the first portion of communications signals for transmission over medium voltage power line 18. At step 210, the modulated first portion of communications signals are transmitted back to medium voltage power line 18. In certain embodiments, the signals may be transmitted through a coupler that may couple to medium voltage power line 18 using inductive coupling, capacitive coupling, conductive coupling, a combination thereof, or any other appropriate technique. For example, the modulated signals may be transmitted to medium voltage power line through a metal oxide varistor (MOV).

At step 212, a destination for a second portion of the communications signals received from medium voltage power line 18 is identified. Although the second portion may be distinct from the first portion, in certain embodiments, all or a fraction of the second portion may be included in the first portion. For example, all of the communications signals included within the first portion may also be included within the second portion. Furthermore, in certain embodiments, the first and second portions may include all of the communications signals received from medium voltage power line 18. At step 214, the second portion of communications signals are modulated. In certain embodiments, modem 102b may modulate the second portion of communications signals for transmission over low voltage power line 24. At step 216, the modulated second portion of communications signals are transmitted to low voltage power line 24. In certain embodiments, the modulated signals may be transmitted to low voltage power line 24 through the use of coupler 110, included within regenerator/customer-access-unit 32.

Thus, method 200 represents a series of steps for enabling communications signals using medium voltage power lines 18. Method 200 represents one mode of operation, and power-line communication system 30 contemplates example devices using suitable techniques, elements, and applications, for performing this method of operation. Many of the steps in the flowchart may take place simultaneously, and in certain embodiments, some of the steps in the flowchart may be taken a different order than shown. For example, in certain embodiments, steps 212, 214, and 216 may occur before, or substantially simultaneous with, the occurrence of steps 206, 208, and 210. In addition, the devices may use any appropriate methods with additional or fewer steps to transmit communications signals using medium voltage power lines 18. Moreover, other devices of system 30 may perform similar techniques to support the transmittal of communications signals over medium voltage power lines 18.

Although the present invention has been described with several embodiments, a plenitude of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A device for enabling broadband communications signals over a medium voltage power line, the device comprising:

a first modem electrically coupled to a medium voltage power line and adapted to receive broadband communications signals from the medium voltage power line;

a second modem electrically coupled to the medium voltage power line and adapted to transmit broadband communications signals to the medium voltage power line;

a third modem electrically coupled to a low voltage power line and adapted to transmit broadband communications signals to the low voltage power line;

one or more switches coupling the first modem, the second modem, and the third modem, and operable to transfer broadband communications signals between two or more of the first modem, the second modem, and the third modem;

a coupler electrically coupled to the third modem and the low voltage power line and operable to transmit communications signals from the third modem to the low voltage power line;

a wireless access point operable to communicate wireless communications signals to and from one or more of the first modem, the second modem, and the third modem; and a housing that physically surrounds the first modem, the second modem, the third modem, the one or more switches, the coupler, and the wireless access point;

wherein the broadband communications signals comprise a transfer rate of at least 1.5 megabits per second in at least one direction.

2. The device of claim 1, wherein one or more of the one or more switches comprise a simple network management protocol (SNMP) agent operable to enable remote management of communications signals between two or more of the first modem, the second modem, and the third modem.

3. A device for enabling communications signals over a medium voltage power line, the device comprising:

a first modem electrically coupled to a medium voltage power line and adapted to receive communications signals from the medium voltage power line;

a second modem electrically coupled to the medium voltage power line and adapted to transmit communications signals to the medium voltage power line;

a third modem electrically coupled to a low voltage power line and adapted to transmit communications signals to the low voltage power line; and one or more switches coupling the first modem, the second modem, and the third modem, and operable to transfer communications signals between two or more of the first modem, the second modem, and the third modem.

4. The device of claim 3, further comprising a housing that physically surrounds the first modem, the second modem, the third modem, and the one or more switches.

5. The device of claim 4, further comprising a coupler electrically coupled to the third modem and the low voltage power line, the coupler disposed within the housing and operable to transmit communications signals from the third modem to the low voltage power line.

6. The device of claim 3, further comprising a wireless access point operable to communicate wireless communications signals to and from one or more of the first modem, the second modem, and the third modem.

7. The device of claim 3, wherein the communications signals comprise broadband signals.

8. The device of claim 7, wherein the broadband signals comprise a transfer rate of at least 1.5 megabits per second in at least one direction.

9. The device of claim 3, wherein at least one of the first, second, and third modems comprise a modem compliant with a HomePlug Powerline Alliance standard.

10. The device of claim 3, wherein the communications signals comprise radio frequency signals.

11. The device of claim 3, wherein one or more of the one or more switches comprise a simple network management protocol (SNMP) agent operable to enable remote management of communications signals between two or more of the first modem, the second modem, and the third modem.

12. The device of claim 3, wherein:

the first modem is further adapted to transmit communications signals to the medium voltage power line;

the second modem is further adapted to receive communications signals from the medium voltage power line; and the third modem is further adapted to receive communications signals from the low voltage power line.

13. A method for enabling communications signals over a medium voltage power line, the method comprising:

using a first modem, receiving communications signals from a medium voltage power line and demodulating the communications signals received from the medium voltage power line;

identifying a destination for a first portion of the communications signals received from the medium voltage power line;

using a second modem, modulating the first portion of the communications signals and transmitting the modulated first portion of the communications signals to the medium voltage power line;

identifying a destination for a second portion of the communications signals received from the medium voltage power line; and using a third modem, modulating the second portion of the communications signals and transmitting the modulated second portion of the communications signals to a low voltage power line.

14. The method of claim 13, further comprising:

using a wireless access point, receiving communications signals from a wireless communications device;

identifying a destination for the communications signals received from the wireless communications device; and transmitting at least a portion of the signals received from the wireless communications device to one or more of the low voltage power line and the medium voltage power line.

15. The method of claim 13, further comprising:

using a wireless access point, receiving control commands from a wireless communications device, the control commands directed to modifying one or more parameters of one or more of:

the first modem;

the second modem;

the third modem; and communications signal traffic between two or more of the first modem, the second modem, and the third modem; and executing the received control commands from the wireless communications device.

16. The method of claim 13, wherein the first modem, the second modem, and the third modem are physically surrounded by a housing.

17. The method of claim 13, wherein the communications signals comprise broadband signals.

18. The method of claim 17, wherein the broadband signals comprise a transfer rate of at least 1.5 megabits per second in at least one direction.

19. The method of claim 13, wherein at least one of the first, second, and third modems comprise a modem compliant with a HomePlug Powerline Alliance standard.

20. The method of claim 13, wherein the communications signals comprise radio frequency signals.

21. The method of claim 13, further comprising:
   using a simple network management protocol (SNMP) agent:
      receiving an SNMP command requesting information related to one or more of:
      the first modem;
      the second modem;
      the third modem; and
      communications signal traffic between two or more of the first modem, the second modem, and the third modem; and
   processing the SNMP command; and
   executing the SNMP command by transmitting the requested information.

22. The method of claim 13, further comprising:

using the third modem, receiving communications signals from the low voltage power line and demodulating the communications signals received from the low voltage power line;

using one or more of the first modem and the second modem, modulating at least a portion of the communications signals received from the low voltage power line and transmitting the modulated portion of the communications signals to the medium voltage power line.

* * * * *